United States Patent
Mizuno

(10) Patent No.: US 8,102,439 B2
(45) Date of Patent: Jan. 24, 2012

(54) IMAGE PICKUP APPARATUS COMPRISING A GENERATING UNIT CONFIGURED TO GENERATE AN IDENTIFIER, METHOD FOR CONTROLLING IMAGE PICKUP APPARATUS, AND STORAGE MEDIUM

(75) Inventor: Takashi Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 364 days.

(21) Appl. No.: 11/959,787

(22) Filed: Dec. 19, 2007

(65) Prior Publication Data

US 2008/0151059 A1   Jun. 26, 2008

(30) Foreign Application Priority Data

Dec. 26, 2006  (JP) ................................ 2006-350147

(51) Int. Cl.
*H04N 5/76* (2006.01)
(52) U.S. Cl. .............. 348/231.6; 348/231.99; 348/231.3
(58) Field of Classification Search .............. 348/208.1, 348/208.11, 231.99, 231.1, 231.2, 231.3, 348/231.5, 231.6
See application file for complete search history.

(56) References Cited

U.S. PATENT DOCUMENTS

| | | | |
|---|---|---|---|
| 2002/0191079 A1* | 12/2002 | Kobayashi et al. | 348/207.1 |
| 2003/0007078 A1* | 1/2003 | Feldis, III | 348/231.6 |
| 2003/0090690 A1* | 5/2003 | Katayama et al. | 358/1.9 |
| 2003/0184652 A1* | 10/2003 | Tanaka et al. | 348/207.1 |
| 2003/0184653 A1* | 10/2003 | Ohkubo | 348/207.1 |
| 2004/0201692 A1* | 10/2004 | Parulski et al. | 348/207.1 |
| 2005/0001904 A1* | 1/2005 | Kiiskinen | 348/207.1 |
| 2005/0041103 A1* | 2/2005 | Kinjo | 348/207.1 |

FOREIGN PATENT DOCUMENTS

| | | | |
|---|---|---|---|
| JP | 10-051721 A | | 2/1998 |
| JP | 2002-271672 A | | 9/2002 |
| JP | 2004-120280 A | | 4/2004 |
| JP | 2005258613 A | * | 9/2005 |
| JP | 2006-115062 A | | 4/2006 |

* cited by examiner

*Primary Examiner* — David Ometz
*Assistant Examiner* — Dwight C Tejano
(74) *Attorney, Agent, or Firm* — Canon USA Inc IP Division

(57) ABSTRACT

An image pickup apparatus captures a subject to obtain image data, is connected to an information processing apparatus, and receives and stores therein information about the information processing apparatus when being connected to the information processing apparatus. The image pickup apparatus generates an identifier on the basis of the information received from the information processing apparatus and count-up information. Then, the image pickup apparatus stores the identifier therein so that the identifier is associated with the image data stored in a storage medium.

8 Claims, 10 Drawing Sheets

FIG. 5

| IMAGE FILE NAME | IDENTIFIER |
|---|---|
| IMG_0001.JPG | 0x10000000000000000000000000000000 |
| IMG_0002.JPG | 0x20000000000000000000000000000001 |
| IMG_0003.JPG | 0xE9839859999900094858889999999999 |
| IMG_0040.JPG | 0x49000000000000000000000000000000 |
| IMG_0102.JPG | 0xD034589999990000000000000000000A |
| IMG_0103.JPG | 0x45000000000000000000000000000000 |
| IMG_0200.JPG | 0x78900000000000000000000000000000 |
| IMG_1000.JPG | 0x90000000000000000000000000000000 |

| IMAGE FILE NAME | IDENTIFIER FILE NAME |
|---|---|
| IMG_0001.JPG | IMG_0001_I.TXT |
| IMG_0002.JPG | IMG_0002_I.TXT |
| IMG_0003.JPG | IMG_0003_I.TXT |
| IMG_0040.JPG | IMG_0040_I.TXT |
| IMG_0102.JPG | IMG_0102_I.TXT |
| IMG_0103.JPG | IMG_0103_I.TXT |
| IMG_0200.JPG | IMG_0200_I.TXT |

# IMAGE PICKUP APPARATUS COMPRISING A GENERATING UNIT CONFIGURED TO GENERATE AN IDENTIFIER, METHOD FOR CONTROLLING IMAGE PICKUP APPARATUS, AND STORAGE MEDIUM

BACKGROUND OF THE INVENTION

1. Field of the Invention

The present invention relates to an image pickup apparatus which stores image data and an identifier which is associated with the image data, a method for controlling the image pickup apparatus, and a storage medium.

2. Description of the Related Art

In recent years, digital cameras have been in widespread use, and therefore, opportunities for capturing images have tended to increase resulting in a large amount of image data in which users deal with. Accordingly, a technique of adding identifiers to pieces of image data so that the pieces of image data are efficiently organized and searched for has been proposed.

Japanese Patent Laid-Open No. 10-51721, for example, discloses a technique of storing a fabrication number of a digital camera, which is unique information of the digital camera, in a storage device of the digital camera at a time of fabrication thereof, generating, at a time when an image is captured, a unique identifier using the fabrication number and information about the time when the image is captured, for example, and adding the identifier to image data representing the image.

However, fabrication numbers are not necessarily added to all digital cameras. Furthermore, even if the fabrication numbers are added to the individual digital cameras at times of fabrication, the fabrication numbers are not necessarily electrically readable.

Therefore, if a digital camera does not have a unique fabrication number assigned thereto, an identifier is not assigned to image data by the technique disclosed in Japanese Patent Laid-Open No. 10-51721.

Furthermore, Japanese Patent Laid-Open No. 10-51721 does not disclosed a technique in which, when receiving image data which does not have identifier added thereto from an apparatus, a digital camera adds an identifier to the received image data.

SUMMARY OF THE INVENTION

The present invention provides a system in which an identifier is associated with image data without using a fabrication number of a digital camera. Some aspects of the present invention are directed to overcoming the above-described drawbacks and disadvantages.

According to an aspect of the present invention, there is provided an image pickup apparatus which includes an image pickup unit configured to capture a subject to obtain image data; an accessing unit configured to access an storage medium in which the image data is stored; a connecting unit configured to connect the image pickup apparatus to an information processing apparatus; a receiving unit configured to receive information about the information processing apparatus when the image pickup apparatus is connected to the information processing apparatus; a first storage unit configured to store the information received from the information processing apparatus; a generating unit configured to generate an identifier on the basis of the information received from the information processing apparatus and count-up information which is updated every time an image is captured using the image pickup unit; and a second storage unit configured to store the identifier therein so that the identifier is associated with the image data stored in the storage medium.

According to another aspect of the present invention, there is provided a method for controlling an image pickup apparatus including capturing a subject to obtain image data; accessing an storage medium in which the image data is stored; connecting the image pickup apparatus to an information processing apparatus; receiving information about the information processing apparatus when the image pickup apparatus is connected to the information processing apparatus; storing the information received from the information processing apparatus; generating an identifier on the basis of the information received from the information processing apparatus and count-up information which is updated every time an image is captured; and storing the generated identifier therein so that the identifier is associated with the image data stored in the storage medium.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

FIG. 5 is a diagram illustrating example names of image files of pieces of image data and pieces of identifier information.

DESCRIPTION OF THE EMBODIMENTS

Exemplary embodiments, features and aspects of the present invention will now be described in detail below with reference to the attached drawings.

First Exemplary Embodiment

Figure 1:
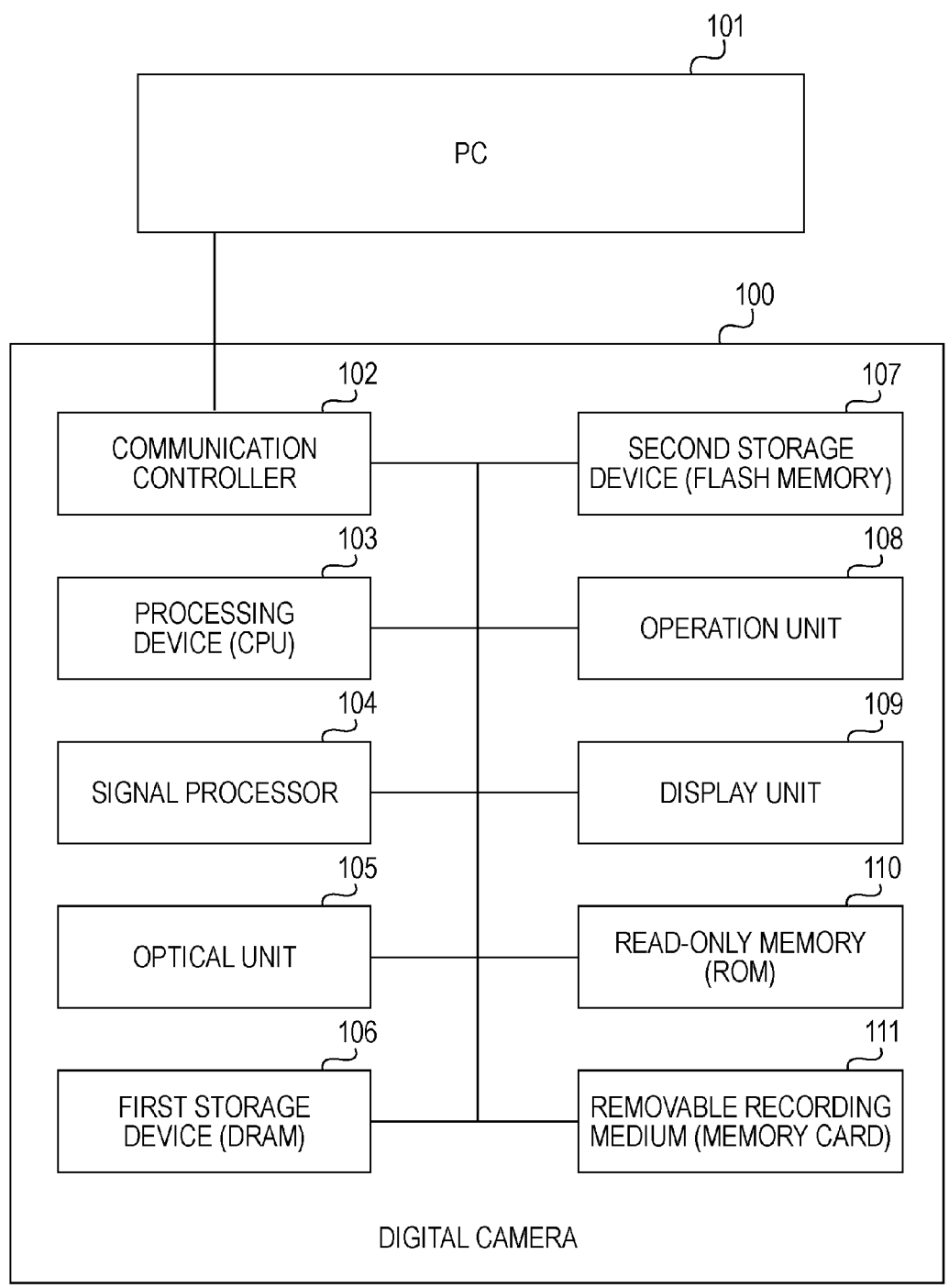
FIG. 1 is a block diagram illustrating an example configuration of a digital camera included in an image processing system according to an embodiment of the present invention.

FIG. 1 is a block diagram illustrating an example configuration of a digital camera included in an image processing system according to an embodiment of the present invention.

In FIG. 1, the image processing system includes a digital camera 100 serving as an image processing apparatus, and a personal computer (PC) 101 serving as an information processing apparatus which communicates with the digital camera 100. The image processing system of this embodiment is constituted by connecting the digital camera 100 and the personal computer 101 to each other by a wired communication or a wireless communication.

The digital camera 100 includes the following units described herein below. A communication controller unit 102 is provided for communicating with the PC 101 and controls wired/wireless communication between the digital camera 100 and the PC 101. A processing device (CPU: Central Processing Unit) 103 entirely controls operation of the digital camera 100 in accordance with an input signal or a program.

A signal processor 104 performs, for example, processing of compressing and encoding, processing of emphasizing a contour, processing of noise reduction, which are performed on a captured image. An optical unit 105 includes a lens, automatic focus system, and a motor for driving a zoom system. A first storage device (DRAM) 106 is used as a temporary storage area for a CPU 103, for example.

A second storage device 107 is a nonvolatile storage device such as a flash memory and stores various parameters, for example, therein. An operation unit 108 includes a cursor, a setting button, an execution button, and a menu key, and is used to input various instructions to the digital camera 100 by a user.

A display unit 109 is used to display image data and graphical user interfaces (GUIs) and employs an LCD (liquid crystal display), for example. A read-only memory (ROM) 110 stores therein control programs executed using the CPU 103. A removable recording medium 111 is a removable medium such as a memory card and stores image data therein. The digital camera 100 includes an interface (not shown) used to access the removable recording medium 111 to obtain the image data via the interface.

Note that an identifier described in each of the embodiments hereinafter is generated using a MAC address, user information, and a connection start time which are stored in a storage device (not shown) included in the PC 101, and count-up information stored in the second storage device 107 of the digital camera 100. The user information is used to identify a user who is currently using the PC 101. For example, the user information includes information about an account of the user who logged in and who is currently using the PC 101. The count-up information is a numerical value which is incremented in accordance with a specific condition and is stored in the second storage device 107. For example, the count-up information has an initial value of "0" and is incremented when an identifier is added or an image is captured.

Figure 2:
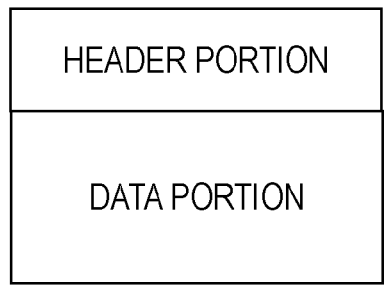
FIG. 2 is a diagram illustrating an example configuration of image data.

FIG. 2 is a diagram illustrating an example configuration of image data. In this embodiment, image data includes a header portion and a data portion as shown in FIG. 2.

An example method for generating identifier corresponding to image data when the PC 101 and the digital camera 100 are connected to each other will be described hereinafter. Here, it is assumed that the count-up information has been already stored in the second storage device 107 included in the digital camera 100.

Figure 3:
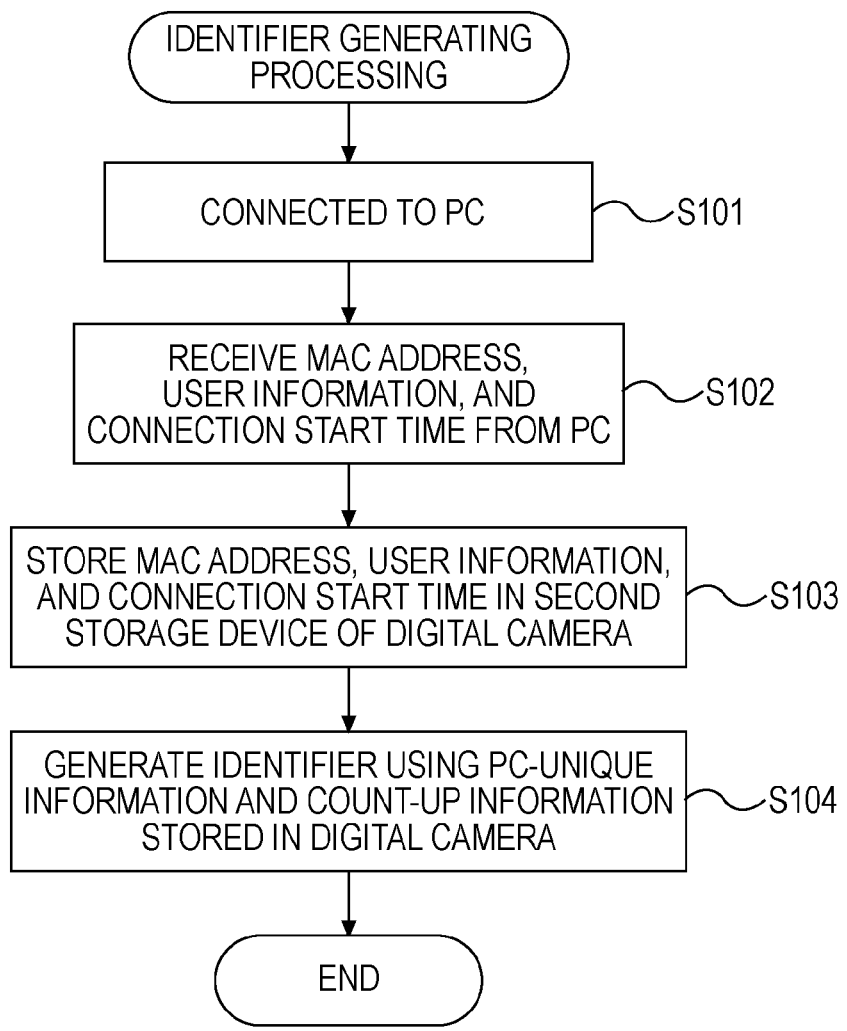
FIG. 3 is a flowchart illustrating an example procedure of identifier generating processing performed in the image processing system shown in FIG. 1.

FIG. 3 is a flowchart illustrating an example procedure of identifier generating processing performed in the image processing system shown in FIG. 1. In FIG. 3, when detecting a USB cable inserted by a user's operation, the digital camera 100 is connected to the PC 101 by a USB connection in step S101.

In step S102, the PC 101 transmits pieces of information uniquely assigned to the PC 101 (hereinafter referred to as pieces of "PC-unique information") such as a MAC address, user information, and a connection start time to the digital camera 100. Here, as the connection start time, a value obtained from an inner timer (not shown) of the PC 101 is transmitted. The digital camera 100 receives the pieces of PC-unique information transmitted from the PC 101.

In step S103, the digital camera 100 stores the MAC address, the user information, and the connection start time as the pieces of PC-unique information in the second storage device 107.

In step S104, the digital camera 100 generates an identifier assigned to image data using the pieces of PC-unique information and the count-up information which are stored in the second storage device 107 of the digital camera 100. Specifically, the identifier is generated using a character string generated by connecting a value of the MAC address of the PC 101, a value of the user ID, a value of the connection start time, and a value of the count-up information stored in the digital camera 100. After the identifier is generated, the identifier generating processing is terminated. Note that the identifier may be obtained by connecting a plurality of values, or may be obtained by calculation using the plurality of values as parameters.

A method for generating an identifier when the digital camera 100 captures a subject and adding the identifier to the header portion of the image data so that the identifier is stored in the removable recording medium 111 will be described hereinafter.

It is assumed that a MAC address, user information, and a connection start time which are transmitted from the PC 101 are stored in advance in the second storage device 107 of the digital camera 100. Furthermore, it is assumed that count-up information is stored in advance in the second storage device 107 of the digital camera 100 and the count-up information is not reset.

Figure 4:
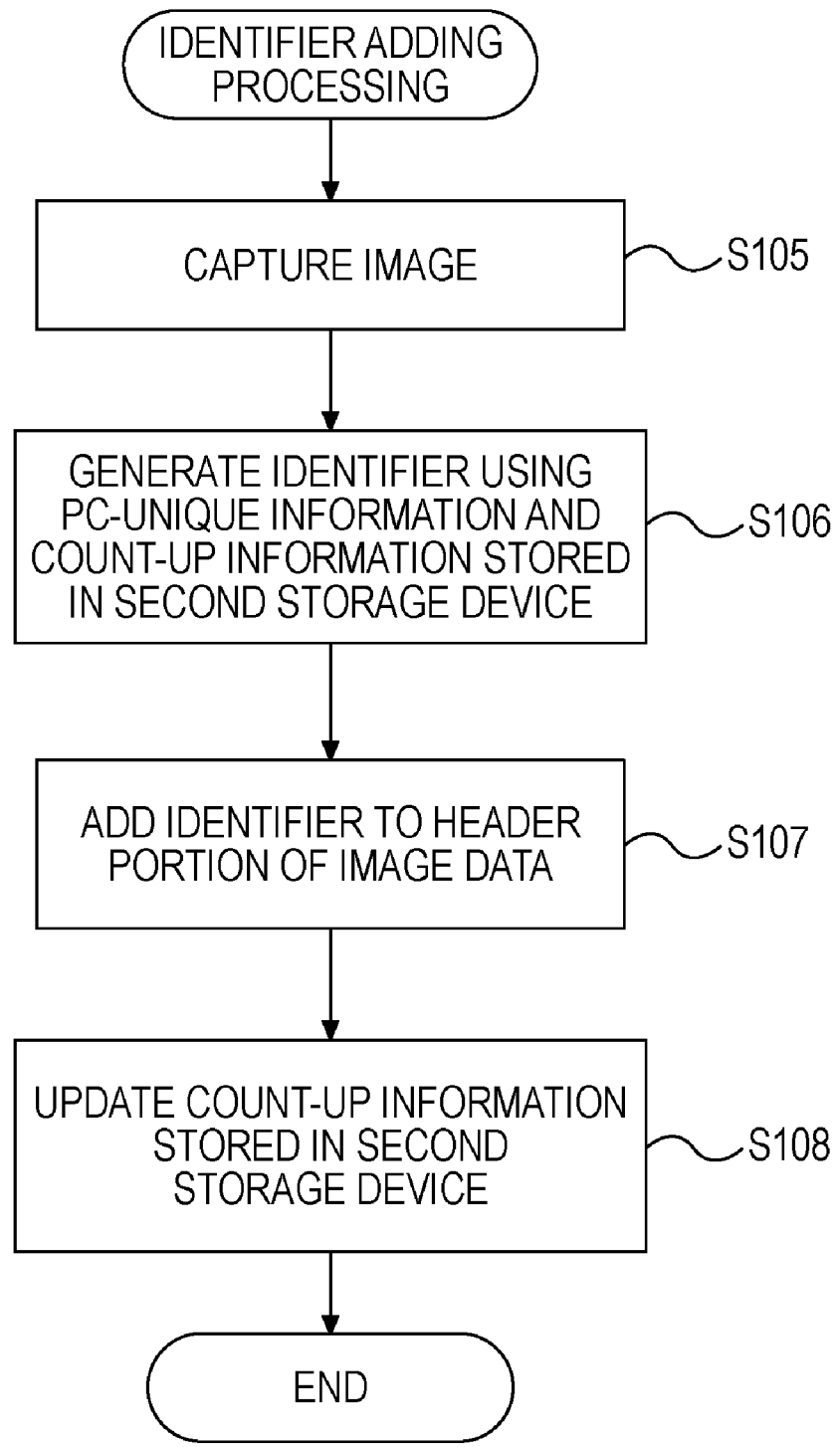
FIG. 4 is a flowchart illustrating an example identifier adding processing according to a first embodiment performed in the image processing system shown in FIG. 1.

FIG. 4 is a flowchart illustrating identifier adding processing according to the first embodiment performed in the image processing system shown in FIG. 1.

In FIG. 4, the digital camera 100 performs a photographing operation to capture a subject so as to obtain image data in step S105. In step S106, the digital camera 100 generates an identifier using the pieces of PC-unique information and the count-up information which are stored in the second storage device 107. An example of the identifier is shown in FIG. 5.

In step S107, the digital camera 100 adds the identifier to the header portion of the image data obtained in step S105 so that the identifier is stored in the removable recording medium 111. In step S108, the value of the count-up information stored in the second storage device 107 of the digital camera 100 is incremented, and the identifier adding processing is terminated.

The processing from step S105 to step S108 is performed each time an image is captured. In this processing, each time the photographing operation is performed, the count-up information is updated, and accordingly, a unique identifier is generated.

Although, in this embodiment, the PC 101 is connected to the digital camera 100 by the USB connection, the PC 101 may be connected to the digital camera 100 by a wired connection such as the IEEE1394 standard or by a wireless connection such as the IEEE802.x standard. Furthermore, an order of step S107 and step S108 in the flowchart of FIG. 4 may be switched. Moreover, the PC 101 may search the digital camera 100 for the image data with reference to the identifier assigned to the image data.

As described above, in this embodiment, identifiers which are to be uniquely assigned to individual pieces of image data are generated using PC-unique information and count-up information received from an external device. Accordingly, a process of assigning a fabrication number to a digital camera at a time of fabrication may be eliminated, and consequently, a production cost may be reduced.

Second Exemplary Embodiment

According to a second embodiment, when being connected to a PC 101, a digital camera 100 checks pieces of image data stored in a removable recording medium 111 so as to determine whether identifiers have been assigned to the individual pieces of image data. This determination is made with reference to header portions of the individual pieces of image data. If image data which does not have an identifier is detected among the pieces of image data stored in the removable recording medium 111, the digital camera 100 adds an identifier to the image data which does not have an identifier so that the identifier is stored in the removable recording medium 111. The second embodiment will be described hereinafter with reference to FIG. 6. Since the second embodiment is mostly similar to the first embodiment, descriptions of components common to the first embodiment are omitted and characteristic components of the second embodiment will be mainly described. The same is true in the following embodiments.

Figure 6:
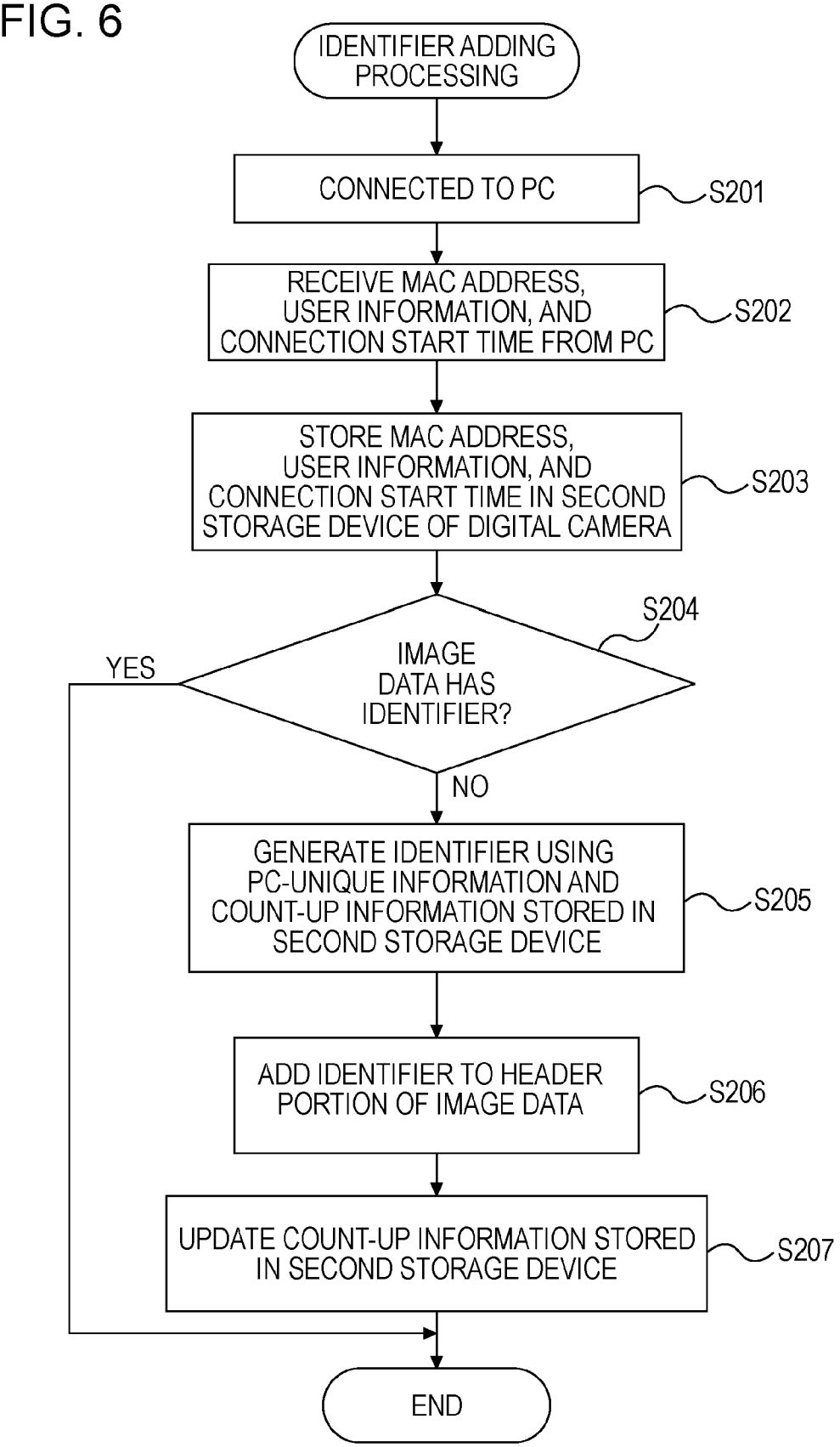
FIG. 6 is a flowchart illustrating an example procedure of identifier adding processing according to a second embodiment performed in the image processing system shown in FIG. 1.

FIG. 6 is a flowchart illustrating an example procedure of identifier adding processing according to the second embodiment performed in the image processing system shown in FIG. 1.

In FIG. 6, when detecting a USB cable inserted by a user's operation, the digital camera 100 is connected to the PC 101 by a USB connection in step S201.

In step S202, the PC 101 transmits pieces of PC-unique information such as a MAC address, user information, and a connection start time to the digital camera 100. The digital camera 100 receives the pieces of PC-unique information transmitted from the PC 101. In step S203, the digital camera 100 stores the MAC address, the user information, and the connection start time in a second storage device 107.

In step S204, the digital camera 100 checks the pieces of image data stored in the removable recording medium 111 so as to determine whether identifiers have been assigned to the individual pieces of image data. If image data which does not have an identifier is detected among the pieces of image data stored in the removable recording medium 111, the process proceeds to step S205.

In step S205, the digital camera 100 generates an identifier using the pieces of PC-unique information and count-up information stored in the second storage device 107. In step S206, the digital camera 100 adds the generated identifier to a header portion of the image data which does not have an identifier so that the identifier is stored in the removable recording medium 111.

In step S207, a value of the count-up information stored in the second storage device 107 in the digital camera 100 is incremented, and the identifier adding processing is terminated. In this embodiment, the count-up information is updated independently from a photographing operation, but is updated when the identifier is added to the image data. Accordingly, even when a plurality of pieces of image data which do not have identifiers are detected, unique identifiers are generated and assigned to the individual pieces of image data, and then, the pieces of image data are stored in the digital camera 100.

In step S204, when it is determined that image data is not captured, and therefore, image data to which an identifier is to be added does not exist in the removable recording medium 111, the identifier adding processing is terminated. The processing from step S204 to step S207 is performed on all the pieces of image data stored in the removable recording medium 111. Note that an order of step S206 and step S207 may be switched.

Third Exemplary Embodiment

According to a third embodiment, before transmitting image data to a PC 101, a digital camera 100 receives pieces of PC-unique information from the PC 101 and adds an identifier to the image data. The third embodiment will be described hereinafter with reference to FIG. 7.

Figure 7:
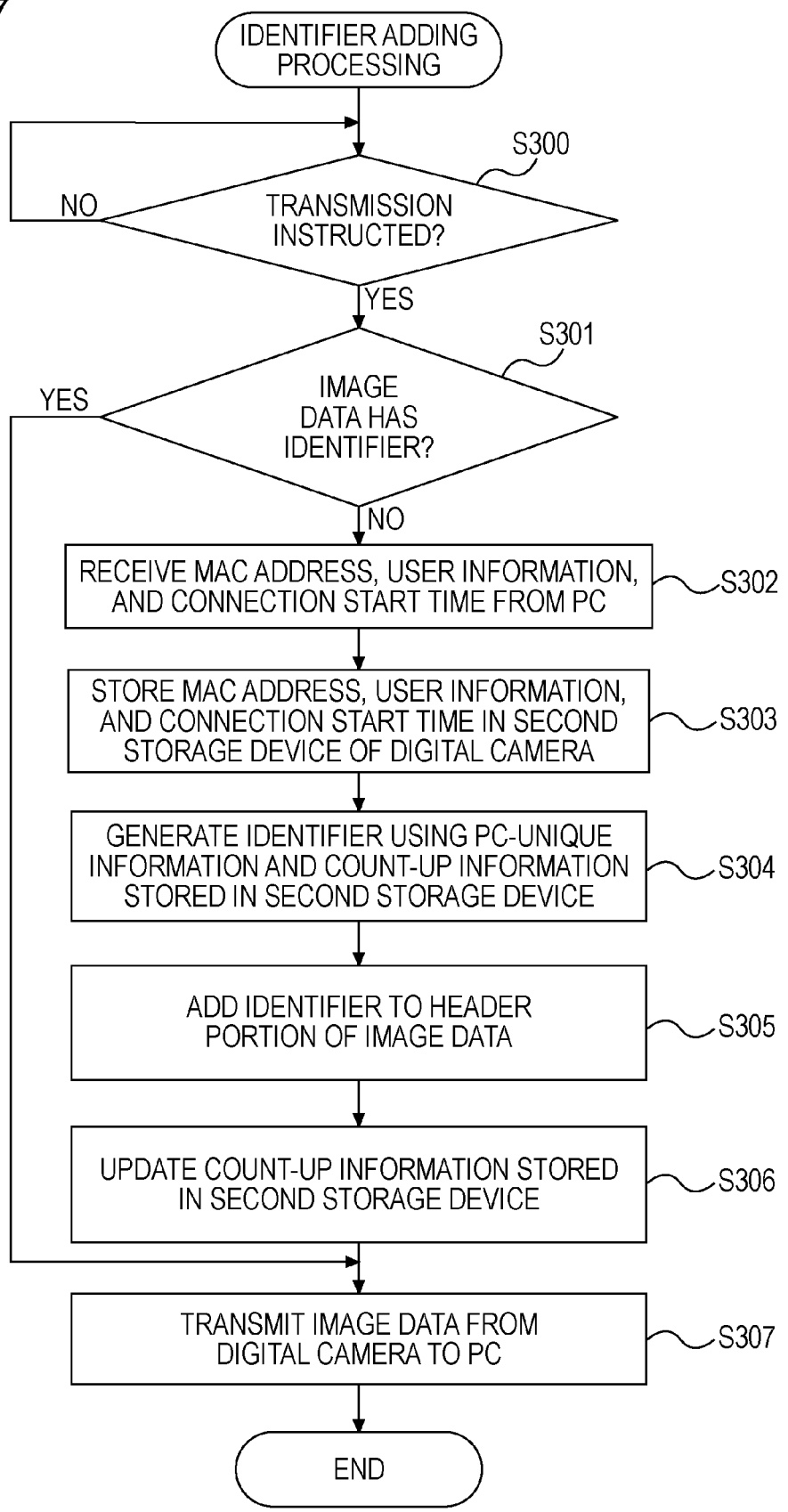
FIG. 7 is a flowchart illustrating an example procedure of identifier adding processing according to a third embodiment performed in the image processing system shown in FIG. 1.

FIG. 7 is a flowchart illustrating an example procedure of identifier adding processing according to the third embodiment performed in the image processing system shown in FIG. 1. The flowchart starts with an instruction for transmission of image data issued from the digital camera 100 to the PC 101 in step S300.

In FIG. 7, the digital camera 100 checks pieces of image data stored in a removable recording medium 111 so as to determine whether one of pieces of image data to be transmitted, among the pieces of image data stored in the removable recording medium 111, has an identifier in step S301.

When it is determined that one of the pieces of image data to be transmitted does not have an identifier, the digital camera 100 requires pieces of PC-unique information of the PC 101 in step S302. The PC 101 transmits a MAC address, user information, and a current time as the pieces of PC-unique information to the digital camera 100. The digital camera 100 receives the pieces of PC-unique information transmitted from the PC 101.

In step S303, the digital camera 100 stores the MAC address, the user information, and a connection start time represented by the current time as the pieces of PC-unique information in a second storage device 107. In step S304, the digital camera 100 generates an identifier using the pieces of PC-unique information and count-up information stored in the second storage device 107.

In step S305, the digital camera 100 adds the generated identifier to a header portion of the one of the pieces of image data to be transmitted and stores the one of the pieces of image data therein. In step S306, the digital camera 100 updates the count-up information stored in the second storage device 107.

In step S307, the digital camera 100 transmits the one of the pieces of image data to be transmitted to which the generated identifier was added to the PC 101, and the identifier adding processing is terminated.

In step S301, when it is determined that all the pieces of data to be transmitted have corresponding identifiers, the process proceeds to step S307 and the identifier adding processing is terminated.

The processing from step S301 to step S307 is performed on all the pieces of image data to be transmitted. Note that an order of step S305 and step S306 may be switched.

As described above, since, every time image data is transmitted to the PC 101, an identifier is added to the image data to be transmitted before the transmission, a user does not have to connect the digital camera 100 to the PC 101 in order to merely generate the identifier.

Note that the count-up information is incremented when the identifier is added to the image data to be transmitted in the digital camera 100 according to this embodiment. Alternatively, the count-up information may be incremented when an image is captured.

Note that the digital camera 100 may store therein first count-up information which is a value obtained by counting the number of times an image is captured using the digital camera 100 and second count-up information which is incremented when an identifier is added or an image is captured. The same is true in the following embodiments.

Fourth Exemplary Embodiment

According to a fourth embodiment, in a case where image data having an identifier is transmitted to another digital camera 100, the image data is stored in the other digital camera 100 after a new identifier is assigned to the image data.

A first digital camera 100-1 and a second digital camera 100-2 are employed in this embodiment and operate as follows. The first digital camera 100-1 which is connected to a PC 101 obtains pieces of first PC-unique information from the PC 101. The first digital camera 100-1 adds first identifiers generated in accordance with the pieces of first PC-unique information to pieces of image data and stores the pieces of image data in a removable recording medium 111. Thereafter, the removable recording medium 111 which stores the pieces of image data therein is removed from the first digital camera 100-1 and is loaded into the second digital camera 100-2. Then, the second digital camera 100-2 is connected to the PC 101. The fourth embodiment having such a configuration will be described hereinafter with reference to FIG. 8.

Figure 8:
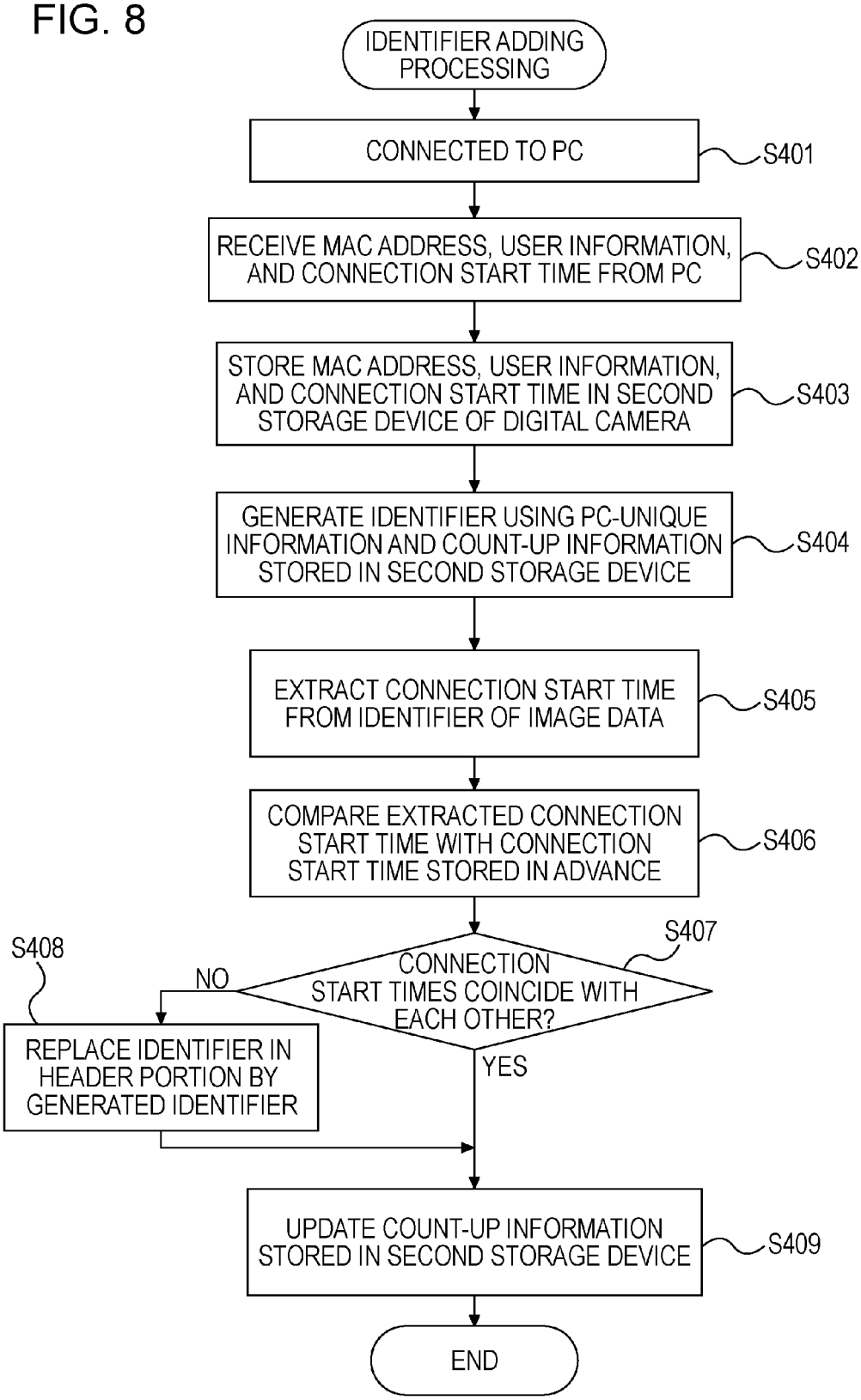
FIG. 8 is a flowchart illustrating an example procedure of identifier adding processing according to a fourth embodiment performed in the image processing system shown in FIG. 1.

FIG. 8 is a flowchart illustrating an example procedure of identifier adding processing according to a fourth embodiment performed in the image processing system shown in FIG. 1. Description will be made hereinafter for one of the pieces of image data as an example.

In FIG. 8, when detecting a USB cable inserted by a user's operation, the second digital camera 100-2 is connected to the PC 101 by a USB connection in step S401. In step S402, the PC 101 transmits pieces of second PC-unique information such as a MAC address, user information, and a connection start time to the second digital camera 100-2. The second digital camera 100-2 receives the pieces of second PC-unique information transmitted from the PC 101.

In step S403, the second digital camera 100-2 stores the MAC address, the user information, and the connection start time as the pieces of second PC-unique information in a second storage device 107. Note that, in a case where the second storage device 107 stores therein a connection start time (hereinafter referred to as a "first connection start time") included in the pieces of first PC-unique information received from the PC 101 in advance before the pieces of second PC-unique information are transmitted from the PC 101, the first connection start time should be separately stored in an area of the second storage device 107.

In step S404, the second digital camera 100-2 generates a second identifier uniquely assigned to image data using the pieces of second PC-unique information and count-up information stored in the second storage device 107 of the second digital camera 100-2. The second identifier is different from the first identifier generated using first digital camera 100-1.

In step S405, the second digital camera 100-2 checks a header portion of the image data stored in the removable recording medium 111 so that the connection start time (hereinafter referred to as a "second connection start time") is extracted from the second identifier. In this embodiment, since the second identifier is a character string generated by connecting values of the pieces of second PC-unique information to each other, the second connection start time is easily extracted from the identifier. The extracted second connection start time is stored in the second storage device 107.

In step S406, the second digital camera 100-2 compares the first connection start time which has been separately stored in the area of the second storage device 107 in step S403 with the second connection start time extracted in step S405.

In accordance with a result of the comparison in step S406, when it is determined that the first connection start time does not coincide with the second connection start time or it is determined that the first connection start time is not stored in the second storage device 107 in step S407, the process proceeds to step S408. On the other hand, when it is determined that the first connection start time coincides with the second connection start time, the identifier adding processing is terminated.

In step S408, the second digital camera 100-2 replaces the first identifier with the second identifier generated in step S405, that is, updates the identifier. In step S409, the second digital camera 100-2 updates the count-up information stored in the second storage device 107, and the identifier adding processing is terminated.

As described above, the second identifier generated using the second digital camera can be newly assigned to the image data captured using the first digital camera.

Furthermore, since the first connection start time stored in advance is compared with the second connection start time included in the second identifier of the image data, the first identifier added using the first digital camera and the second identifier added using the second digital camera can be distinguished.

Fifth Exemplary Embodiment

According to a fifth embodiment, when image data having a first identifier assigned using a first digital camera is transmitted from the first digital camera to a second digital camera, the image data keeps the first identifier even when the image data is stored in the second digital camera.

In the fourth embodiment described above, the first identifier which was added to the image data in advance is replaced by the second identifier which is generated after the second digital camera 100-2 and the PC 101 are connected to each other. On the other hand, in the fifth embodiment, the first identifier is not replaced by the second identifier, but the second identifier is assigned to image data which does not have the first identifier. The fifth embodiment will be described hereinafter with reference to FIG. 9.

Figure 9:
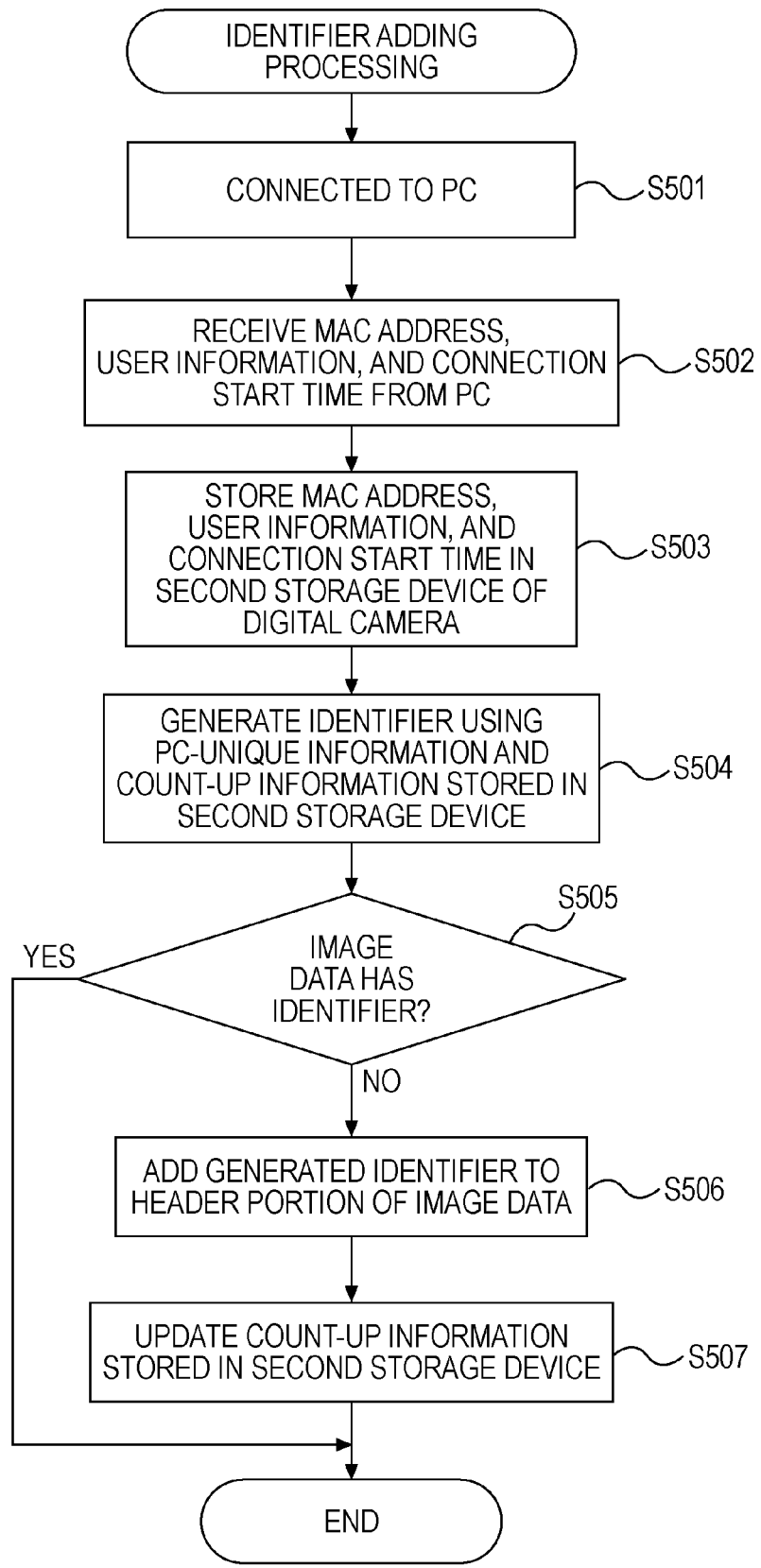
FIG. 9 is a flowchart illustrating an example procedure of identifier adding processing according to a fifth embodiment performed in the image processing system shown in FIG. 1.

FIG. 9 is a flowchart illustrating an example procedure of identifier adding processing according to a fifth embodiment performed in the image processing system shown in FIG. 1.

The processing performed from step S501 to step S504 are the same or similar to the processing performed from step S401 to step S404 in the fourth embodiment, and therefore, a description thereof is omitted.

Processes of step S505 and subsequent steps will be described hereinafter. In step 505, a second digital camera 100-2 determines whether image data has a first identifier. When it is determined that the image data has the first identifier, the identifier adding processing is terminated.

On the other hand, when it is determined that the image data does not have the first identifier, the process proceeds to step S506.

In step S506, the second digital camera 100-2 adds a second identifier generated in step S504 to a header portion of the image data. In step S507, the second digital camera 100-2 updates count-up information stored in a second storage device 107, and the identifier adding processing is terminated.

Accordingly, second identifiers are added to only pieces of image data which do not have first identifiers, and the first identifiers which have been already assigned are not written.

Sixth Exemplary Embodiment

According to a sixth embodiment, when image data having a first identifier is transmitted from a first digital camera 100-1 to a second digital camera 100-2, a second identifier is assigned to the image data and stored in the removable recording medium 111.

In the fourth embodiment described above, the first identifier which was added to the image data in advance is replaced by the second identifier. On the other hand, in the sixth embodiment, the first identifier is not replaced by the second identifier, but the second identifier is additionally assigned to both of image data having the first identifier and image data which does not have the first identifier. That is, image data may have a plurality of identifiers. The sixth embodiment will be described hereinafter with reference to FIG. 10.

Figure 10:
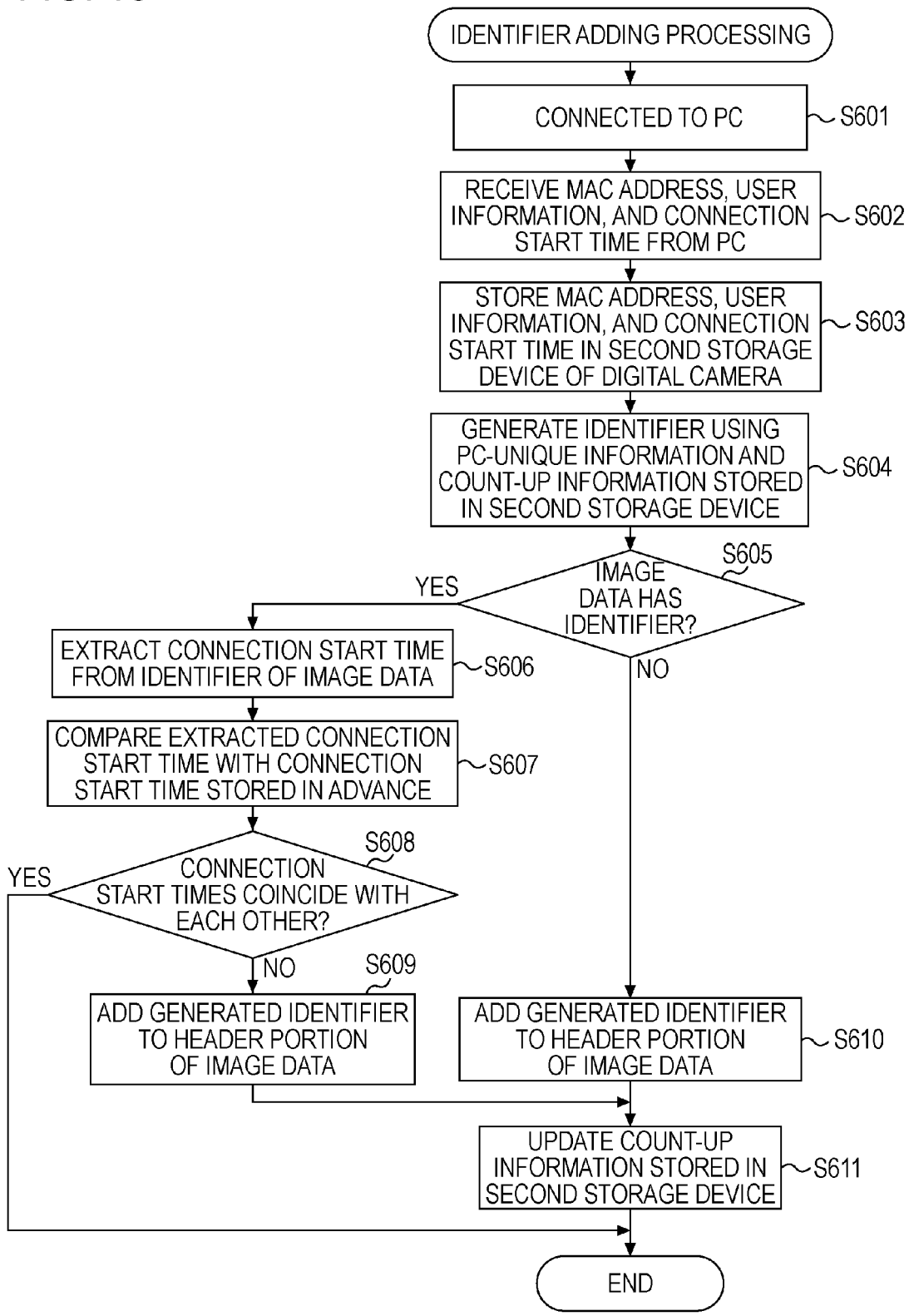
FIG. 10 is a flowchart illustrating an example procedure of identifier adding processing according to a sixth embodiment performed in the image processing system shown in FIG. 1.

FIG. 10 is a flowchart illustrating an example procedure of identifier adding processing according to a sixth embodiment performed in the image processing system shown in FIG. 1.

In FIG. 10, the processing performed from step S601 to step S605 are the same or similar to the processing performed from step S501 to step S505 in the fifth embodiment, and therefore, description thereof is omitted.

Processes of step S605 and subsequent steps will be described hereinafter. When it is determined that image data has a first identifier in step S605, a second digital camera 100-2 extracts a second connection start time from a second identifier of the image data in S606. Since the second identifier is constituted by a character string generated by connecting values of pieces of second PC-unique information, the second connection start time is easily extracted. The extracted second connection start time is stored in a second storage device 107.

In step S607, the second digital camera 100-2 compares a first connection start time which has been separately stored in an area of the second storage device 107 in step S603 with the second connection start time extracted in step S606.

In accordance with a result of the comparison in step S607, when it is determined that the first connection start time does not coincide with the second connection start time or it is determined that the first connection start time is not stored in the second storage device 107 in step S608, the process proceeds to step S609. On the other hand, when it is determined that the first connection start time coincides with the second connection start time, the identifier adding processing is terminated. In step S609, the second digital camera 100-2 adds a second identifier generated in step S604 to a header portion of the image data having the first identifier. Then, the identifier adding processing is terminated.

When it is determined that the image data does not have the first identifier in step S605, the second digital camera 100-2 adds the second identifier to the header portion of the image data and stores the second identifier in the removable recording medium 111 in S611.

In step S611, the second digital camera 100-2 updates count-up information stored in the second storage device 107. Then, the identifier adding processing is terminated.

As described above, image data may have a first identifier which was assigned in advance and a second identifier which is generated using a digital camera newly connected to a PC at the same time.

Seventh Exemplary Embodiment

According to the first to sixth embodiment described above, an identifier is added to a header portion of image data. However, according to a seventh embodiment, an identifier is managed using management information representing the relationships between the identifier and a image file and is stored as a file separately from the image data.

It is assumed that a MAC address, user information, a connection start time transmitted from a PC 101 is stored as pieces of PC-unique information in a first storage device 106 of a digital camera 100.

Figures 11, 12:
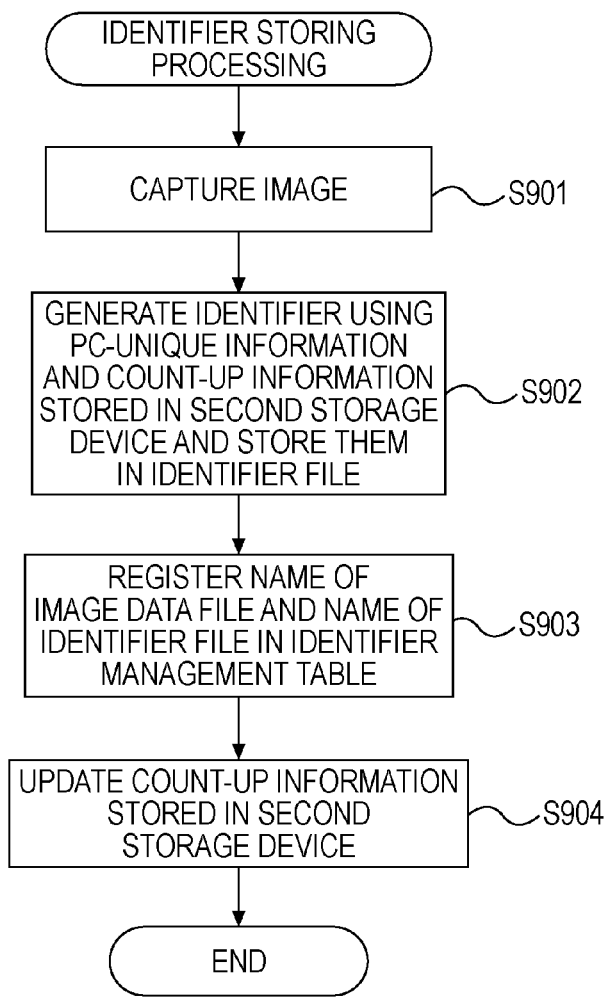
FIG. 11 is a diagram illustrating an example identifier management table.
FIG. 12 is a flowchart illustrating an example procedure of identifier storing processing performed in the image processing system shown in FIG. 1.

Furthermore, it is assumed that count-up information is stored in a second storage device 107 of the digital camera 100 and is not reset. The digital camera 100 stores an identifier management table in the second storage device 107. A configuration of the identifier management table is shown in FIG. 11. As shown in FIG. 11, the identifier management table manages image file names and identifier file names so that the image file names and the identifier file names are associated with each other.

Referring to FIG. 12, an example in which an identifier for an image file "IMG_1000.JPG" is generated and is stored as an identifier file "IMG_1000_I.TXT" in the identifier management table T along with a name of the image file will be described.

FIG. 12 is a flowchart illustrating a procedure of identifier storing processing performed in the image processing system shown in FIG. 1.

In FIG. 12, a digital camera 100 performs a photographing operation in step S901. In step S902, the digital camera 100 generates an identifier using the pieces of PC-unique information and the count-up information stored in the second storage device 107. Thereafter, an identifier file in which the identifier is described is generated. A name of the identifier file of this embodiment is determined on the basis of a name of image data file. For example, the name of the image data file is "IMG_1000.JPG", a file name "IMG_1000_I.TXT", for example, is assigned to the identifier file. The generated identifier file is stored in the second storage device 107.

In step S903, the digital camera 100 associates the name of the image data file "IMG_1000.JPG" corresponding to the captured image with the name of the identifier file "IMG_1000_I.TXT" and stores them in the identifier management table.

In step S904, the digital camera 100 updates the count-up information, and then, the identifier storing processing is terminated. Note that an order of step S903 and step S904 may be switched.

In this embodiment, identifier files are generated so as to correspond to image files. However, relationships between image files and identifiers may be described in one file. That is, the digital camera 100 may store a list of the relationships between an image file and an identifier shown in FIG. 11 as a management file.

Other Exemplary Embodiments

It is noted that the embodiments of the present invention described hereinabove may be used in combination.

The present invention may provide the following processes. Specifically, a storage medium in which a program code of software realizing the functions of the embodiments described above is supplied to a system or an apparatus, and then, a computer (a CPU or a MPU) included in the system or the apparatus reads the program code stored in the storage medium.

In this case, the program code read from the storage medium realizes the functions of the embodiment described above, and therefore, the program code and the storage medium which stores the program code therein are included in the present invention.

Examples of the storage medium used to supply the program code include a floppy (registered trademark) disc, a hard disc, a magneto-optical disc, a CD-ROM (Compact Disc Read-Only Memory), a CD-R (Compact Disc Readable), a CD-RW (Compact Disc Rewritable), a DVD-ROM (Digital Versatile Disc Read-Only Memory), a DVD-RAM (Digital Versatile Disc Random Access Memory), a DVD-RW (Digital Versatile Disc-Rewritable), a DVD+RW (Digital Versatile Disc+Rewritable), a magnetic tape, a nonvolatile memory card, and a ROM (Read-Only Memory). Alternatively, the program code may be downloaded through the network.

The present invention includes a case where the functions of the embodiments described above are realized by executing the program code read by using the computer. In addition, the present invention includes a case where, on the basis of an instruction issued in accordance with the program code, part of or all processing is performed using an OS (Operating System) to realize the functions of the embodiments described above.

Furthermore, the present invention includes a case where the functions of the embodiment described above are realized by performing the following processing. Specifically, the program code read from the storage medium is written to a memory included in a function expansion board inserted into the computer or a memory included in a function expansion unit connected to the computer. Thereafter, on the basis of an instruction issued in accordance with the program code, a CPU performs part of or all processing.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

This application claims the benefit of Japanese Application No. 2006-350147 filed Dec. 26, 2006, which is hereby incorporated by reference herein in its entirety.

What is claimed is:

1. An image pickup apparatus, comprising:
an image pickup unit configured to capture a subject to obtain image data;
an accessing unit configured to access an storage medium in which the image data is stored;
a connecting unit configured to connect the image pickup unit to an information processing apparatus;
a receiving unit configured to receive information about the information processing apparatus when the image pickup apparatus is connected to the information processing apparatus;
a first storing unit configured to store the information received from the information processing apparatus;
a generating unit configured to generate an identifier on the basis of a plurality of information, the plurality of information including information received from the information processing apparatus and count-up information which is updated every time an image is captured using the image pickup unit;
a second storing unit configured to store the identifier therein so that the identifier is associated with the image data stored in the storage medium; and
a determining unit configured to determine whether image data which is not associated with the identifier is stored in the storage medium,
wherein when the determining unit determines that the image data which is not associated with the identifier is stored in the storage medium, the second storing unit associates the identifier generated using the generating unit with the image data and stores the image data therein,
wherein the determining unit determines whether the image data which is associated with the identifier assigned by another apparatus is stored in the storage medium, and when it is determined that the image data which is associated with the identifier assigned by the another apparatus is stored in the storage medium, the generating unit generates a new identifier using the information received from the information processing apparatus and the count-up information.

2. The image pickup apparatus according to claim 1, wherein the count-up information is updated every time the second storing storage unit stores the identifier therein.

3. The image pickup apparatus according to claim 1, wherein when the determining unit determines that the image data which is associated with the identifier assigned by the another apparatus is stored in the storage medium the second storage unit replaces the identifier assigned by the other apparatus with the newly generated identifier.

4. The image pickup apparatus according to claim 1 wherein when determining unit determines that the image data which is associated with the identifier assigned by the another apparatus is stored in the storage medium, the second storing unit does not associated the newly generated identifier to the image data.

5. The image pickup apparatus according to claim 1 wherein when determining unit determines that the image data which is associated with the identifier assigned by the another apparatus is stored in the storage medium, the second storing unit associates with the newly generated identifier to the image data associated with the identifier assigned by the other apparatus.

6. The image pickup apparatus according to claim 1, wherein the information about the information processing apparatus includes at least one of a MAC address, user information, and a time when the image pickup apparatus is connected to the image processing apparatus.

7. A method for controlling an image pickup apparatus, comprising:

capturing a subject to obtain image data;
accessing a storage medium in which the image data is stored;
connecting the image pickup apparatus to an information processing apparatus;
receiving information about the information processing apparatus when the image pickup apparatus is connected to the information processing apparatus;
storing, in a first storing unit, the information received from the information processing apparatus;
generating an identifier on the basis of a plurality of information, the plurality of information including information received from the information processing apparatus and count-up information which is updated every time an image is captured;
storing, in a second storing unit, the generated identifier therein so that the identifier is associated with the image data stored in the storage medium, and
determining whether image data which is not associated with the identifier is stored in the storage medium,
wherein when it is determined that the image data which is not associated with the identifier is stored in the storage medium, the second storing unit associates the generated identifier with the image data and stores the image data therein,
wherein it is determined whether the image data which is associated with the identifier assigned by another apparatus is stored in the storage medium, and when it is determined that the image data which is associated with the identifier assigned by the another apparatus is stored in the storage medium, a new identifier is generated using the information received from the information processing apparatus and the count-up information.

8. A non-transitory computer-readable storage medium storing computer-executable instructions for controlling an image pickup apparatus, the medium comprising:
computer-executable instructions for capturing a subject to obtain image data;
computer-executable instructions for accessing a storage medium in which the image data is stored;
computer-executable instructions for connecting the image pickup apparatus to an information processing apparatus;
computer-executable instructions for receiving information about the information processing apparatus when the image pickup apparatus is connected to the information processing apparatus;
computer-executable instructions for storing, in a first storing unit, the information received from the information processing apparatus;
computer-executable instructions for generating an identifier on the basis of a plurality of information, the plurality of information including information received from the information processing apparatus and count-up information which is updated every time an image is captured;
computer-executable instructions for storing, in a second storing unit, the generated identifier therein so that the identifier is associated with the image data stored in the storage medium; and
computer-executable instructions for determining whether image data which is not associated with the identifier is stored in the storage medium,
wherein when it is determined that the image data which is not associated with the identifier is stored in the storage medium, the second storing unit associates the generated identifier with the image data and stores the image data therein,
wherein it is determined whether the image data which is associated with the identifier assigned by another apparatus is stored in the storage medium, and when it is determined that the image data which is associated with the identifier assigned by the another apparatus is stored in the storage medium, a new identifier is generated using the information received from the information processing apparatus and the count-up information.

* * * * *